United States Patent [19]
Krochta et al.

[11] Patent Number: 5,543,164
[45] Date of Patent: Aug. 6, 1996

[54] WATER-INSOLUBLE PROTEIN-BASED EDIBLE BARRIER COATINGS AND FILMS

[75] Inventors: John M. Krochta, Davis; Tara H. McHugh, Albany, both of Calif.

[73] Assignee: The Regents of the University of California, Oakland, Calif.

[21] Appl. No.: 261,472

[22] Filed: Jun. 17, 1994

[51] Int. Cl.$^6$ .............................. A23B 4/10; A23B 7/16; A23B 9/14; A21D 15/08
[52] U.S. Cl. .............................. 426/302; 426/92; 426/93; 426/102; 426/103; 426/310
[58] Field of Search .............................. 426/302, 92, 93, 426/102, 103, 310

[56] References Cited

U.S. PATENT DOCUMENTS

| | | |
|---|---|---|
| 2,198,215 | 4/1940 | Musher . |
| 2,282,801 | 5/1942 | Musher . |
| 3,997,674 | 12/1976 | Ukai et al. . |

FOREIGN PATENT DOCUMENTS

| | | |
|---|---|---|
| 0465801A1 | 1/1992 | European Pat. Off. . |

OTHER PUBLICATIONS

McHugh, T. H., et al., *J. of Food Science*, 59(2):416–420 (1994).
Kester, et al., *Food Technol.*, 40:47–59 (1986).
Krochta, *Advances in Food Engineering*, CRC Press, Inc., Boca Raton, Florida, Singh and Wirakartakusumab (Eds.), pp. 517–538 (1992).
Gennadios, et al., in *Edible Coatings and Films to Improve Food Quality*, Technomic Publishing Co., Lancaster, PA, Krochta, Baldwin and Nisperos–Carriedo (Eds.), Chapter 9, pp. 201–277 (1994).
Donovan, et al., *J. Food Sci. and Technol.* 11:87–100 (1987).
Shimada, et al., *J. Agric. Food Chem.* 37:161–168 (1989).

*Primary Examiner*—Esther M. Kepplinger
*Assistant Examiner*—Choon P. Koh
*Attorney, Agent, or Firm*—Townsend and Townsend and Crew LLP

[57] ABSTRACT

This invention describes new water-insoluble protein-based edible coatings and films having improved barrier and mechanical properties, and methods for their preparation from water-soluble proteins. In the invention, aqueous protein solutions are denatured with heat, chemicals and/or enzymes to induce thiol-disulfide interchange and thiol oxidation reactions, thereby forming new intermolecular and intramolecular disulfide crosslinkages. The formation of covalent intermolecular crosslinkages in protein-based edible films and coatings results in films having improved barrier and mechanical properties which are insoluble in water. Water-insoluble emulsion film systems can be formed by incorporating lipids into the denatured aqueous protein matrix.

37 Claims, 3 Drawing Sheets

WATER-INSOLUBLE PROTEIN-BASED EDIBLE BARRIER COATINGS AND FILMS

This invention describes new water-insoluble protein-based edible coatings and films having improved barrier and mechanical properties, and methods for their preparation from water-soluble proteins.

BACKGROUND OF THE INVENTION

Consumer demands for both higher quality and longer shelf-life foods have stimulated edible film research. The environmental movement has promoted increased concern about reducing disposable packaging amounts and increasing packaging recyclability, further contributing to the recent surge in edible coating and film research. Edible films and coatings are capable of offering solutions to these concerns by regulating the mass transfer of water, oxygen, carbon dioxide, lipid, flavor, and aroma movement in food systems. Edible coatings function by direct adherence to food products; whereas, edible films act as stand-alone sheets of material used as wrappings.

Dried foods, low moisture baked products, and intermediate and high moisture foods all exhibit potential for improvement through the use of edible coatings and films. Dried foods (e.g., dried vegetables and dried meats) and low moisture baked products (e.g., crackers, cookies and cereals) are particularly susceptible to moisture uptake from the atmosphere. Low moisture baked foods are also susceptible to moisture uptake from moist fillings and toppings. Such changes can result in loss of sensory acceptability of the food product, as well as a reduced shelf-life. Many dried and baked products are also susceptible to oxidation, lipid migration and volatile flavor loss.

Intermediate moisture foods, such as raisins and dates, often become unacceptable due to moisture loss over time. Moisture loss is particularly problematic when the moisture transfers into lower moisture components of a food system. For example, raisins can lose moisture to the bran in raisin bran. Nut meats, another intermediate moisture food, are susceptible to lipid oxidation resulting in the development of off flavors.

High moisture food components typically lose moisture to lower moisture components. One classical example of this phenomenon occurs when pizza sauce moisture migrates into the crust during storage, resulting in a soggy crust. Oxidation and flavor loss are also problematic to high moisture food systems. The respiration rates of whole fruits and vegetables often dictate their shelf lives. Minimally processed fruits and vegetables are often subject to unacceptable levels of oxidative browning. Individual food products within the broad food categories discussed above require different barrier properties in order to optimize product quality and shelf-life. Edible films and coatings are capable of solving the barrier problems of these and a variety of other food systems. See, Kester, et al., Food Technol. 40:47–59 (1986) and Krochta, in *Advances in Food Engineering*, CRC Press, Inc., Boca Raton, Fla. Singh and Wirakartakusumab (Eds.) p. 517–538 (1992).

Edible films and coatings based on water-soluble proteins are typically water-soluble themselves and exhibit excellent oxygen, lipid and flavor barrier properties; however, they are poor moisture barriers. Additionally, proteins act as a cohesive, structural matrix in multicomponent systems to provide films and coatings having good mechanical properties. Lipids, on the other hand, act as good moisture barriers, but poor gas, lipid, and flavor barriers. By combining proteins and lipids in emulsion or bilayer barriers, the advantages of each component can be exploited to form an improved film system. Plasticizer addition improves film mechanical properties.

The properties of composite bilayer films and coatings have been studied in the past. Cohesive bilayer films and coatings are often difficult to form and delamination may occur over time. Furthermore, bilayer film and coating formation often requires the use of solvents or high temperatures, making production more costly and less safe than aqueous emulsion film production. Protein-lipid emulsion film and coating systems can be formed from aqueous solutions and applied to foods at room temperature.

Water-insoluble edible films and coatings offer numerous advantages over water-soluble edible films and coatings for many food product applications. Increasing levels of covalent crosslinking in water-insoluble edible films and coatings result in better barriers to water, oxygen, carbon dioxide, lipids, flavors and aromas in food systems. Film mechanical properties are also improved. Many foods, such as fruits and vegetables, are exposed to water during shipping and handling. In these cases, water-insoluble films and coatings remain intact; whereas, water-soluble films and coatings dissolve and lose their barrier and mechanical properties. Edible films in the form of wraps, such as sandwich bags, also require water-insolubility.

Prior to this invention, water-soluble, protein-based edible films and coatings have been formed from aqueous solutions of proteins (Gennadios, et al., in *Edible Coatings and Films to Improve Food Quality*, Technomic Publishing Co., Lancaster, Pa., Krochta, Baldwin and Nisperos-Carriedo (Eds.), Chapter 9, (1994)); however, a means to produce water-insoluble films and coatings from aqueous solutions with improved barrier properties had not been discovered. Carmelization and/or maillard browning reactions had been exploited for the formation of improved protein-based oxygen barrier coatings for fruits and vegetables (Musher, U.S. Pat. No. 2,282,801). Protein thiol-disulfide interchange and free thiol oxidation reactions had been studied previously (see Donovan, et al., *J. Food Sci. and Technol.* 11:87–100 (1987) and Shimada, et al., *J. Agric. Food Chem.* 37:161–168 (1989)); however, the use of these reactions for the formation of new and improved edible barriers had not been explored. Edible moisture barrier coatings had been formed out of protein-based aqueous emulsions (see, Adams, et al., EP 0 465 801 A1 and Ukai, et al., U.S. Pat. No. 3,997,674); however, methods for the formation of water-insoluble protein-based films and coatings had not been discovered.

Others have studied the interactions between proteins and lipids at interfaces in emulsions and colloidal systems. See, Barfod, et al., in *Food Proteins*, American Oil Chemists Society, Kinsella and Soucie, eds., (1989) and Le Meste, et al., in *Interactions of Food Proteins*, American Chemical Society, Washington, D.C., Parris and Barford, eds., (1991). However, regulation of mass transfer as a function of lipid particle size and distribution in films has not been explored.

What is needed is a method for preparing water-insoluble protein-based edible films and coatings from aqueous solutions which exhibit improved barrier and mechanical properties.

Quite surprisingly, the present invention fulfills this and other needs.

SUMMARY OF THE INVENTION

This invention describes novel methods for the formation of water-insoluble protein-based edible films and coatings from aqueous solutions having improved barrier and mechanical properties. In these methods, aqueous protein solutions are denatured with heat, chemicals and/or enzymes to induce thiol-disulfide interchange and thiol oxidation reactions, thereby forming new intermolecular and intramolecular disulfide crosslinkages. The formation of covalent intermolecular crosslinkages in protein-based edible films and coatings results in films having improved barrier and mechanical properties which are insoluble in water. Water-insoluble emulsion film systems can be formed by incorporating lipids into the denatured aqueous protein matrix. This invention further describes water-insoluble protein-based edible films and coatings prepared using these methods. These films and coatings exploit the potential of disulfide crosslinkages and offer many advantages over more traditional water-soluble edible films and coatings.

DETAILED DESCRIPTION

Figure 1:
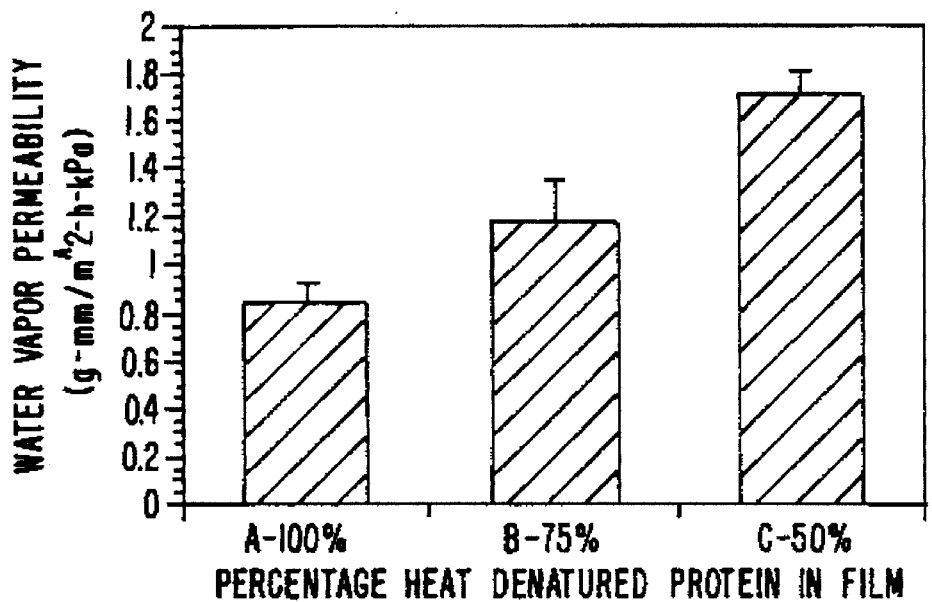
FIG. 1 shows the effect of heat denaturation on the water vapor permeability of whey protein/beeswax/sorbitol edible emulsion films. In Bar "A", the film was prepared with 100% heated whey protein isolate (WPI). In Bar "B", the film was prepared with 75% heated WPI and 25% unheated WPI. In Bar "C", the film was prepared with 50% heated WPI and 50% unheated WPI.

Definitions and Abbreviations:

The following abbreviations are used herein: WPI, whey protein isolate; WVP, water vapor permeability; PVC, poly(vinyl chloride); PVDC, poly(vinylidene chloride); RH, relative humidity.

As used herein, the term "coating" refers to a thin film which surrounds the coated object. Coatings will not typically have the mechanical strength to exist as stand-alone films and are formed by applying a diluted component mixture to an object and evaporating excess solvent.

As used herein, the term "dissolved gases" refers to any gases, including oxygen, nitrogen, and air which become entrapped in a fluid mixture.

As used herein, the term "disulfide formation" refers to the formation of new —S—S— bonds which can occur either intermolecularly or intramolecularly. These bonds can be formed in the proteins used in preparation of the films and coatings of the present invention by several routes. Disulfide formation can take place via thiol oxidation reactions wherein the free sulfhydryl groups of cysteine residues become oxidized and form disulfide bonds. Additionally, thiol-disulfide exchange reactions can take place wherein existing intramolecular disulfide bonds are broken by heat, chemical or enzymic means and allowed to form new disulfide bonds which are a mixture of the intermolecular and intramolecular variety.

As used herein, the term "lipid component" refers to all oils, waxes, fatty acids, fatty alcohols, monoglycerides and triglycerides having long carbon chains of from 10 to 20 or more carbon atoms, which are either saturated or unsaturated. Examples of "lipid components" are beeswax, paraffin, carnuba wax, stearic acid, palmitic acid and hexadecanol.

As used herein, the term "food grade plasticizer" refers to compounds which increase the flexibility of films and which have been approved for use in foods. Preferred plasticizers are polyalcohols such as glycerol, sorbitol and polyethylene glycol.

As used herein, the term "protein" refers to isolated proteins having cysteine and/or cystine residues which are capable of undergoing thiol-disulfide interchange reactions and/or thiol oxidation reactions. Additionally, the proteins will be substantially free of any sugars. Preferred proteins are those which are isolated from milk, wheat, soy, egg, and corn.

As used herein, the term "film" refers to a stand-alone thin layer of material which is flexible and which can be used as a wrapping. Films of the present invention are formed either with a protein or a protein in combination with a lipid and/or a plasticizer. Additionally, films may be formed from emulsified mixtures containing proteins and lipids.

DESCRIPTION OF THE INVENTION

The present invention provides several new methods for the preparation of water-insoluble protein-based edible films and coatings. Improvement of the barrier properties and functionality of protein-based edible coatings and films can be achieved by the formation of new intermolecular disulfide cross-linkages. These cross-linkages can be formed by thiol disulfide interchange and/or thiol oxidation using either heat, chemical or enzymatic means. Additionally, the formation of intermolecular-covalent disulfide bonds allows more effective film formation and renders the film or coating water-insoluble. Treatment of coating solutions to effect such disulfide formation can be performed prior to coating a food product or in situ following coating of the food product in order to form an improved coating system.

Water-insoluble protein films offer numerous advantages over water-soluble edible films for many food product applications. The films and coatings produced by the present inventive method are useful in protecting agricultural products and baked food products from moisture migration, respiration and oxidative degradation, thus increasing product quality and extending product shelf-life. Flavor, aroma and lipid barrier properties can also be improved, as can film mechanical properties.

Protein-lipid emulsion edible film systems are also useful for improving the quality and shelf life of food products. Protein-lipid emulsion films are especially effective at retarding moisture loss from fruits, vegetables and baked food products. These films can also control oxidation and respiration rates in food systems. Furthermore, emulsion coatings can be applied directly on or between food components to regulate water vapor, oxygen, carbon dioxide and lipid transfer, as well as the loss of volatile flavors and aromas in foods. Moreover, edible water-insoluble protein-based films and coatings can decrease amounts of traditional polymer packaging materials necessary to protect food products and allow for improvement of the recyclability of traditional synthetic polymer films.

In its most general application the present invention provides a method for preparing a protein-based water-insoluble coating for a food item, comprising:

(i) treating an aqueous solution of a protein, in which the protein is present in an amount of from 5 to 20% by weight, to effect disulfide formation in the protein and form a denatured protein solution; and (ii) applying the denatured protein solution to a food item and drying to form a coating for the food item.

In the present inventive method, the first step is the formation of an aqueous denatured protein solution. Prior to denaturation, the protein will typically be solubilized in an aqueous solution in a concentration range of from 5 to 20% by weight, preferably about 8 to 10% by weight. All proteins having cysteine and/or cystine groups are capable of undergoing thiol-disulfide interchange and thiol oxidation reactions and are useful in the present inventive method. Preferred proteins are milk proteins, whey proteins, wheat proteins, egg proteins, corn zein, soy proteins, peanut proteins, keratin and caseins. Particularly preferred is whey protein.

The treatment whereby the thiol-disulfide exchange is effected can be a heat treatment, a chemical treatment or an enzymic treatment, preferably a heat treatment. When a heat treatment is used, the aqueous protein solution will be heated to a temperature above the denaturation temperature of the particular protein for a period of time sufficient to initiate disulfide crosslinkage reactions. These thiol-disulfide interchange and thiol oxidation reactions can be either intramolecular or intermolecular. The precise temperature and length of time for a given protein can be determined empirically, but will typically involve temperatures of from about 70° to 95° C., preferably from about 75° to 85° C., and a length of time of up to 3 hours, preferably from about 15 to 45 minutes. When a chemical treatment is used, the protein will be brought into contact with a chemical agent for a period of time sufficient to initiate disulfide rearrangements. The chemical agents which can carry out these reactions are well known to one of skill in the art and include, for example, mercaptoethanol, cysteine, dithiothreitol and sulfites.

Following reduction of disulfide bonds and thiol-disulfide interchange, any remaining free thiol groups can be oxidized either by exposure to atmospheric oxygen or by reaction with oxidizing agents. Thiol-disulfide exchange and thiol oxidation in a protein can also be carded out enzymically using enzymes such as protein disulfide reductase (NAD(P)H and glutathione), sulfhydryl oxidase, lipoxygenase and peroxidase. The result of these reactions is a solution of a denatured protein having a mixture of intermolecular and intramolecular disulfide crosslinks.

In the second step of the present inventive method, the denatured protein solution is applied to a food item and water is evaporated to form a coating for the food item. The method of application is not critical and will depend upon the particular food item. Suitable application methods include dipping, brushing and spraying. Similarly, the method of evaporation is not critical. Water can be removed by standing in air at ambient temperature. Alternatively, water can also be removed by gently warming the coated food item and exposing it to a stream of air or other suitable gas such as nitrogen.

In preferred embodiments, dissolved gases are removed from the aqueous protein solution prior to denaturing the protein. The removal of dissolved gases prevents formation of air bubbles in the films and increases both the mechanical strength of the film and the ability of the film to control mass transfer in foods. The method selected for removal of dissolved gases is not critical, however, a preferred method involves subjecting the solution to reduced pressures by means of a vacuum pump or water aspirator.

In certain embodiments of the invention, a lipid component is added to the denatured protein solution between step (i) and step (ii). A variety of lipid components of varying chain lengths can be used to form effective films. The lipid component can be a fatty acid, a fatty alcohol, a wax, a triglyceride, a monoglyceride or any combination thereof. Examples of fatty acids which are useful in the present invention are stearic acid, palmitic acid, myristic acid and lauric acid. Examples of fatty alcohols which can be used in the present invention are stearyl alcohol and hexadecanol. Waxes which are useful in the present invention include beeswax, carnuba wax, microcrystalline wax and paraffin wax. The lipid component will typically be present in an amount of from 1 to 30% by weight in solution, preferably about 2 to 15% by weight in solution.

In certain other embodiments of the invention, a food grade plasticizer is added to the denatured protein solution. Preferably, the food grade plasticizer is added to the denatured solution along with the lipid component. The food grade plasticizer serves to increase both the mechanical strength of the film and its flexibility. The plasticizer is preferably a polyalcohol, for example, sorbitol, glycerol or polyethylene glycol. The amount of food grade plasticizer which is added will typically be about 1 to 15% by weight in solution, preferably about 2 to 10% by weight in solution.

In still other embodiments, the denatured protein solution which contains a lipid component is heated to a temperature above the melting point of the lipid component and homogenized for a period of time sufficient to form an emulsion. Heating the denatured protein solution can take place either prior to or following the addition of the lipid component. After allowing time for the lipid component to melt, the mixture is homogenized to form an emulsion having particle sizes of from 0.05 to 4.0 microns. Particle sizes of from 0.05 to 1.0 micron are preferred for food items requiring less of a water barrier. Increasing the time of homogenization results in smaller particle sizes and in turn a reduction in water vapor permeability. The use of emulsions having particle sizes which are controlled by homogenization allows for the formation of coatings wherein water, oxygen, carbon dioxide, lipid and flavor barrier properties can be controlled depending on the particular need. Increased homogenization also improves the mechanical properties of the coating.

When composite mixtures are formed containing proteins in combination with lipids or food grade plasticizers or both, it is preferred to remove dissolved gases from the mixture. As noted above, the method of removal will typically involve subjecting the solution to reduced pressures by means of a vacuum pump or water aspirator.

In another aspect, the present invention provides a method for preparing a protein-based water-insoluble edible film for use as a food wrap. This method comprises;

(i) treating an aqueous solution of a protein, in which the protein is present in an amount of from 5 to 20% by weight in solution, to effect disulfide formation in the protein and form a denatured protein solution; and (ii) forming the denatured protein solution into a stand-alone film.

Preferred embodiments for the method of preparing films are as described for the method of preparing coatings above.

In particular, the protein is preferably a milk protein, a whey protein, caseins, a wheat protein, a soy protein, an egg protein, a peanut protein, corn zein or keratin. Additionally, composite mixtures can be formed by adding lipids, food grade plasticizers or a combination thereof to the denatured protein solution. Preferred lipids and food grade plasticizers are those provided for the method of preparing water-insoluble protein-based coatings.

In certain embodiments of the invention, dissolved gases are removed from the aqueous protein solution. Alternatively, dissolved gases are removed from the denatured protein solution prior to forming the film of step (ii).

In certain other embodiments, the denatured protein solution containing a lipid is heated above the melting point of the lipid and homogenized for a period of time sufficient to form an emulsion.

The particular method employed to form the film is not critical, but will typically involve applying the denatured protein solution to a flat surface and allowing the solvent (water) to evaporate. In a preferred embodiment, the denatured protein solution is pipetted onto polymethylmethacrylate plates and allowed to dry. The resulting films can then be peeled intact from the plates.

In a particularly preferred embodiment, 8 to 10% of whey protein isolate is dissolved in water. A vacuum is applied to remove dissolved gases and the solution is heated at greater than 75° C. for at least 15 min. The solution is cooled and 2 to 10% of a food grade plasticizer is added followed by the addition of 2 to 10% beeswax. The beeswax is melted at 75° C. and homogenized at greater than 75° C., to produce an emulsion. The emulsion is transferred onto a level surface and dried to form an intact film.

The present invention also provides a method of forming a water-insoluble protein-based edible coating in situ on a foodstuff. This method comprises the steps:

(i) dissolving a protein in water to produce an aqueous protein solution, wherein the protein is present in an amount of from about 5 to 20% by weight, (ii) coating the foodstuff with the aqueous protein solution, and (iii) subjecting the coated foodstuff to conditions sufficient to induce disulfide bond rearrangements in the protein and provide a water-insoluble protein-based edible coating.

In one embodiment, the protein is a milk protein, a whey protein, a casein, a wheat protein, a soy protein, an egg protein, a peanut protein, corn zein or keratin. In another embodiment, dissolved gases are removed from the aqueous protein solution prior to step (ii). Preferably, composite mixtures are formed by adding lipids, food grade plasticizers or a combination thereof to the aqueous protein solution. Preferred lipids and food grade plasticizers are those provided for the method of preparing water-insoluble protein-based coatings and films, above.

In another embodiment, the aqueous protein solution containing a lipid is heated above the melting point of the lipid and homogenized for a period of time sufficient to form an emulsion.

In step (ii) of the present inventive method, a foodstuff is coated with the aqueous protein solution. The method of coating the foodstuff is not critical and will depend upon the particular food item. Suitable application methods include dipping, brushing and spraying.

In step (iii) of the present inventive method, the coated foodstuff is subjected to conditions sufficient to induce disulfide formation in the protein to provide a foodstuff having a water-insoluble protein-based coating. The treatment whereby disulfide formation is effected is preferably a heat treatment, a chemical treatment or an enzymic treatment, most preferably a heat treatment. The precise conditions will be determined empirically and are the same as those described above. Additionally, consideration must be given to the nature of the foodstuff and any potential damaging effects of a particular treatment on that foodstuff.

In still another aspect, the present invention provides protein-based water-insoluble coatings for foodstuffs which consist essentially of a denatured protein, a lipid component and a food grade plasticizer. Preferred embodiments for the protein, the lipid component and the food grade plasticizer are as described for the above methods.

In still another aspect, the present invention provides protein-based water-insoluble films which consist essentially of a denatured protein, a lipid component and a food grade plasticizer. Preferred embodiments for the protein, the lipid component and the food grade plasticizer are as described for the above methods.

The present invention also provides foodstuffs coated with the coatings and films described above.

The following examples are provided by way of illustration and not by way of limitation.

EXAMPLES

Materials

Whey protein isolate was obtained from LeSueur Isolates, Le Sueur, Minn., U.S.A.). Glycerin and sorbitol were obtained from Fisher Scientific (Fair Lawn, N.J., U.S.A.). White beeswax, stearic acid, palmitic acid, myristic acid, lauric acid, stearyl alcohol and hexadecanol were obtained from Aldrich Chemical Company (Milwaukee, Wis., U.S.A.). Myvacet 5.07 was obtained from Eastman Chemical Products Inc. (Kingsport, Tenn., U.S.A.). Saturated aqueous salt solutions were prepared from salts available from Fisher Scientific.

Methods

Film Formation

Plasticized Solutions

Various percentage whey protein aqueous solutions between 6% and 12% were prepared and a vacuum was applied to prevent formation of air bubbles in the films. Solutions were then heated for various times between 15 and 45 minutes, as well as at different temperatures between 70° C. and 100° C. in a Haake oil bath obtained from Fisher Scientific (Fair Lawn, N.J., U.S.A.). Next, selected amounts of plasticizers were added and a vacuum was applied.

Emulsions

Ten percent whey protein solutions were heated at 90° C. for 30 minutes in an oil bath. The whey protein solutions were then cooled to 75° C. and various amounts of lipids were added. After allowing time for the lipid to melt, the mixture was homogenized using an Ultra-Turrax T25 (IKA-Works, Inc., Cincinnati, Ohio, U.S.A.) for various time intervals and rpm speeds. Further homogenization was performed at various pressures using an APV Rannie laboratory homogenizer. Selected amounts of plasticizers, glycerin or sorbitol, were then added and a vacuum applied.

Film Casting

Film solutions and emulsions were applied at 2.625 g total solids onto a 14.7 cm internal diameter, rimmed, smooth, polymethylmethacrylate (Plexiglas) plate sitting on a leveled granite surface. Six films were prepared for each type of film. The solutions and emulsions were spread evenly with a bent glass rod and allowed to dry overnight for approximately 18 hours at room temperature. The result was a film that could be peeled intact from the casting surface.

Film Thickness

Thicknesses of the films were measured with a micrometer at five random positions around the film. Average thicknesses were used in all WVP calculations.

Water Vapor Permeability Determination

Test Cups

Model test cups were made out of Plexiglas in the machine shop at the University of California, Davis. The bottom of the cup had an outside diameter of 8.2 cm. The area of the cup mouth was 78.5 cm$^2$. The well inside the cup had a depth of 1.2 cm. Silicon sealant (High Vacuum Grease, Dow Corning, Midland, Mich., U.S.A.) and four screws, symmetrically located around the cup circumference, were used to seal films into test cups.

Desiccator Cabinets

Cabinets were purchased from Fisher Scientific, Inc. (Fair Lawn, N.J., U.S.A.) and variable speed motors with attached fans were installed by the machine shop at the University of California, Davis. These cabinets were placed in a 24° C. controlled temperature room. Air speeds were measured using a Solomat anemometer (Stamford, Conn., U.S.A.). Fan speeds were set to achieve air speeds of 500 ft/min in the cabinets. Each cabinet contained an Airguide hygrometer (Chicago, Ill., U.S.A.) to monitor the relative humidity conditions within the cabinets. Prior to each experiment, cabinets were equilibrated to 0% relative humidity (RH) using calcium sulfate Drierite desiccant (Fisher Scientific, Inc., Fair Lawn, N.J., U.S.A.).

Water Vapor Permeability Determination

Six milliliters of distilled water or equivalent amounts of saturated salt solutions were placed in the bottoms of the test cups to expose the film to a high percentage relative humidity inside the test cups. Next, films were mounted in the cups. The distance between the solution and the film was determined both before and after each experiment using a micrometer. After assembly, the test cups with films were inserted into the pre-equilibrated 0% RH desiccator cabinets. After about two hours, steady state had been achieved and five weights were taken for each cup at greater than two hour intervals. Four samples of each film were tested. Finally, the WVP correction method was employed to calculate the water vapor permeability properties of the film as described by McHugh et al. *J. Food. Sci.* 58:899–903 (1993). The WVP correction method accounts for the water vapor partial pressure gradient in the stagnant air layer of the test cup when testing hydrophilic edible films. The conventional ASTM method for WVP determination does not account for this partial pressure gradient and can result in an error of up to 35%. Use of the WVP correction method enables accurate determination of relative humidity conditions during testing.

Gas Permeability Determination

Oxygen Permeability Determination

A MOCON OXTRAN 2-20 (Minneapolis, Minn., U.S.A.) unit was used to measure the oxygen permeability properties of the films. This system provides the flexibility of testing films under a variety of relative humidity and temperature conditions.

Example 1

This example describes the effect of heat treatment on the mechanical strength of whey protein-based edible films.

Heat treatment was necessary for the formation of whey protein based edible films. Without heat treatment, whey protein films cracked into small pieces when dried, due to a lack of sufficient intermolecular cross-linking. Heat treatment resulted in the formation of intermolecular disulfide bonds by thiol-disulfide interchange and thiol oxidation reactions. The addition of new intermolecular disulfide bonds provided a film which was water-insoluble.

The effects of the time and temperature of heat treatment on the WVP of 62.5% WPI and 37.5% sorbitol films at 25° C. were examined. The minimum heat treatment necessary for the formation of intact whey protein films was 75° C. for 30 min. Films formed at 75° C. were weaker than those formed using more severe heat treatments.

Example 2

This example illustrates the effect of heat treatment on the water vapor permeability of a whey protein/beeswax/sorbitol film.

To determine the effect of heat treatment on WVP, three emulsion films were prepared as described in the Methods section. The emulsion films were each composed of whey protein/beeswax/sorbitol (56%/28%/16%), but differed in amounts of heated and unheated WPI which was incorporated. Film A contained 100% heated WPI. Film B contained 75% heated WPI and 25% unheated WPI. Film C contained 50% each of heated and unheated WPI. Water vapor permeability for each of the films was determined as described in the Methods section. The beneficial effect of heat treatment on the water vapor permeability (WVP) properties of whey protein based emulsion films is shown in FIG. 1.

As FIG. 1 illustrates, heat denaturation improves the water barrier properties of protein edible films. Films formed using 100% heat denatured WPI exhibited the lowest WVPs. All of the films formed using denatured whey protein were insoluble in water.

Example 3

This example describes the effect of protein concentration on WVP properties.

The WPI concentration in a heated solution was found to effect both the ability to form intact films and the WVP characteristics of films which were formed. At concentrations below 8% WPI, intact films were not formed. At concentrations of 8–10% WPI, filmed could be formed and were similar in their WVP. However, the 10% WPI films were stronger than those formed using 8% WPI solutions. At concentrations greater than 10% WPI, solutions began to gel. Films formed from 12% WPI had significantly higher WVPs due to the inability to remove air bubbles, caused by the increased viscosity of the solutions. Above 12% WPI, solutions formed gels which could not be cast to form films. As a result, conditions for film formation were optimized at 10% WPI solutions.

Example 4

This example illustrates the effect of various lipid components and their concentrations on WVP.

Figure 2:
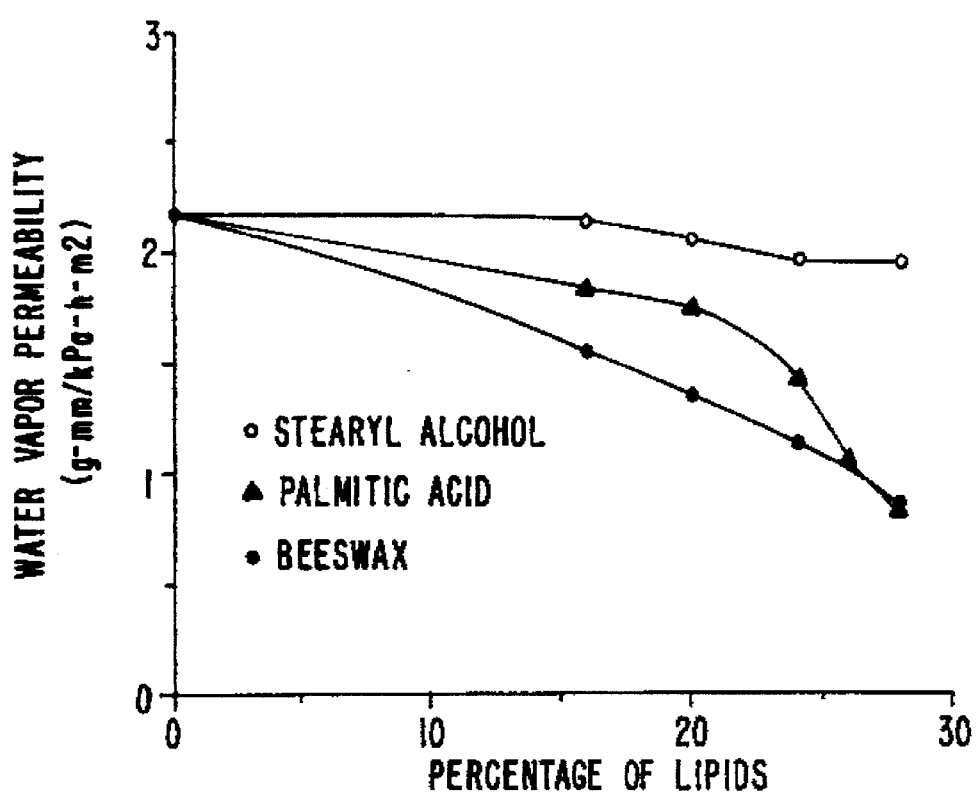
FIG. 2 shows the effect of lipid type and concentration on water vapor permeability of whey protein isolate-based emulsion films. The lipid content was increased from 0 to 28% for beeswax (●), palmitic acid (▲) and stearyl alcohol (○).

Emulsion films were prepared in which the amount of the lipid component was varied from 0 to 28%. Additionally, three different lipids were used, including a fatty acid (palmitic acid), a fatty alcohol (stearyl alcohol) and a wax (beeswax). The films were formed as described in the Methods section, except that all composite mixtures were homogenized at 13,500 rpm for 1.5 min and at 20,500 rpm for 4 min. Water vapor permeability was measured for each film and the results are presented in FIG. 2. Fatty acid and wax emulsion films were found to exhibit lower permeability properties than films formed from fatty alcohols. As lipid concentrations increased, film WVP values decreased. This effect was more apparent in palmitic acid and beeswax films than in stearyl alcohol films.

Other experiments examined the effect of lipid chain length on WVP. Both fatty acids and fatty alcohols showed significantly lower WVP values with increasing chain lengths from C12 to C18 (results not shown).

The effect of various lipid types on the WVP of 80% sodium caseinate/20% lipid emulsion films was also examined. Beeswax emulsion films were shown to have significantly lower WVP values than either stearic acid or myvacet emulsion films. Beeswax emulsion films exhibited a WVP of ~0.55 g•mm/kPa•h•m$^2$, while WVP values for stearic acid and myvacet were ~0.70 and ~1.1, respectively.

Example 5

This example illustrates the effect of relative humidity on WVP of whey protein films.

Figure 3:
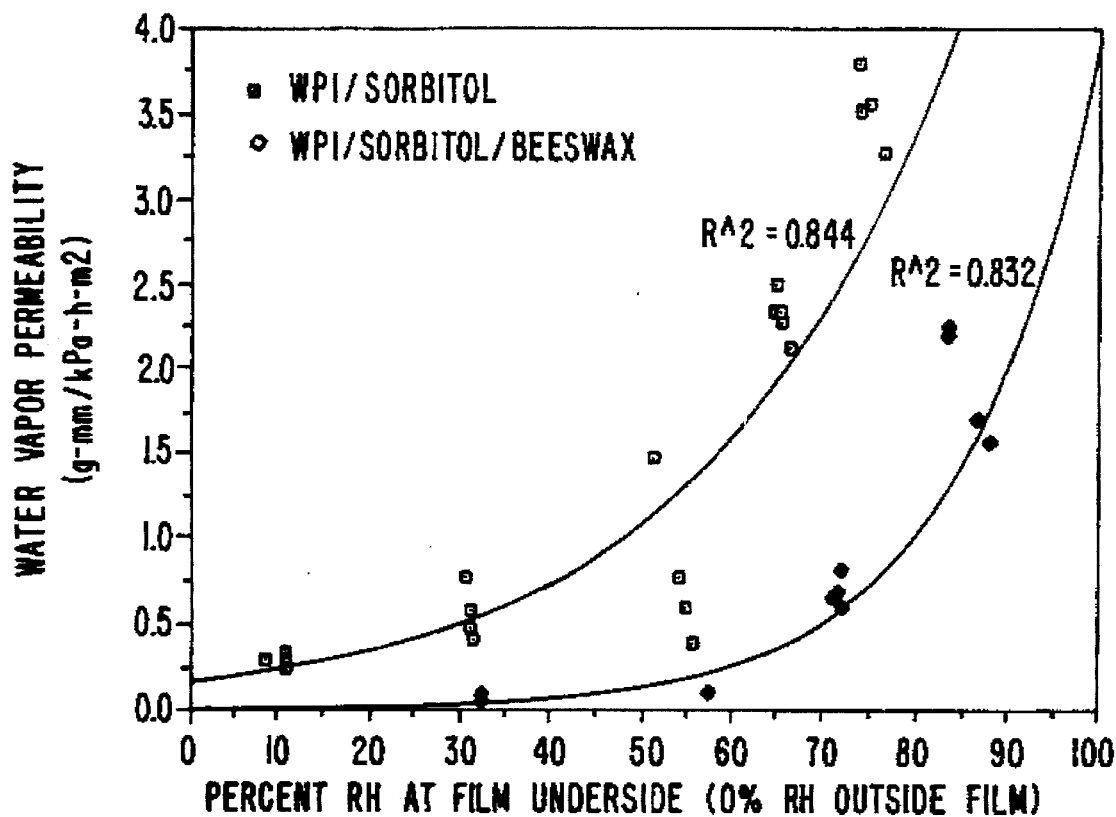
FIG. 3 shows the effect of relative humidity on water vapor permeability of whey protein-based edible films containing sorbitol and whey protein films containing sorbitol and beeswax.

The effects of variable relative humidity gradients on the permeability properties of edible films are depicted in FIG. 3. Each point on the graph represents the water vapor permeability measured when the film was exposed to the relative humidity on the x-axis at the inner surface of the films and 0% relative humidity outside the cup. An exponential relationship between WVP and RH is apparent. This relationship points out the importance of accurately determining the true relative humidity conditions present when measuring WVP properties. A new approach called the WVP correction method has been developed which ensures accurate determination of film RH and WVP values (see, McHugh et al., 1993). FIG. 3 also shows that the effect of relative humidity on WVP is less in whey protein emulsion films than in pure whey protein films. This occurs due to the increased hydrophobicity of emulsion films. These curves are particularly useful for predicting film permeability properties for food products stored under any relative humidity gradient, basically by subtracting the areas of interest under the curves.

Example 6

This example illustrates the impressive oxygen barrier properties of various protein-based edible films, as well as the effect relative humidity has on oxygen permeability.

Figure 4:
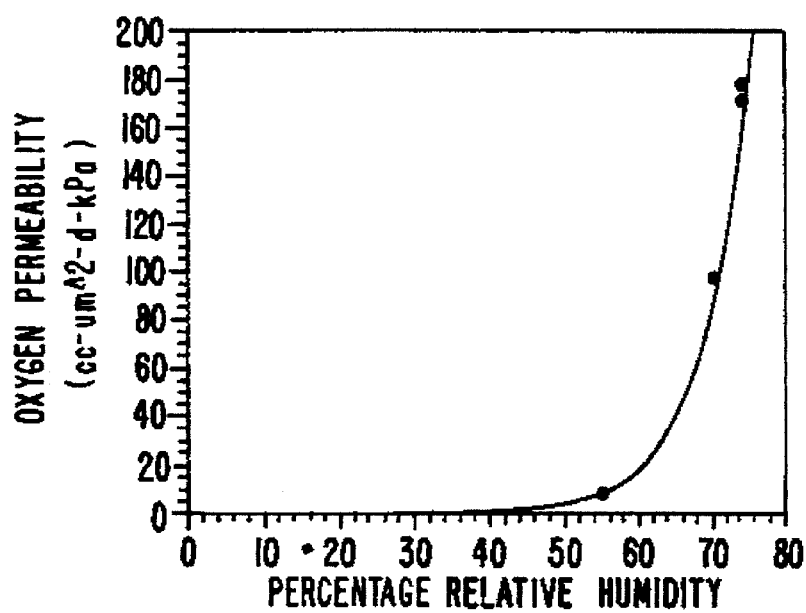
FIG. 4 shows the effect of relative humidity on the oxygen permeability of whey protein/sorbitol edible films.

Oxygen permeability of a number of edible films was measured using a Mocon Oxtran 2-20 unit (Minneapolis, Minn., U.S.A.) as described in the Methods above. FIG. 4 shows the exponential effect of relative humidity on the oxygen permeability of 70% whey protein/30% sorbitol edible films. The plasticizing and/or swelling effect of water on hydrophilic (polar) polymers, such as whey proteins, resulted in increased permeability values. Relationships such as the one shown in FIG. 4 are critical for modeling the behavior of edible films for application to food products having different water activities and/or stored under different relative humidity conditions.

Table I compares the oxygen permeability properties of various protein-based edible films with those of synthetic films. All protein-based films are excellent oxygen barriers. The addition of beeswax to whey protein films resulted in significantly increased oxygen permeability. The oxygen permeabilities of protein films were lower than high density polyethylene and compared favorably to ethylene-vinyl alcohol to polymer and polyvinylidene chloride films.

TABLE I

Oxygen Permeability Properties of Various Protein-Based Edible Films Compared to Synthetic Films

| Film | Test Conditions | Oxygen Permeability* (cm$^3$–µm/ m$^2$–d–kPa) |
| --- | --- | --- |
| Whey Protein Isolate: Glycerol (5.7:1) | 23° C., 50% RH | 18.5 |
| Whey Protein Isolate: Sorbitol (2.3:1) | 23° C., 50% RH | 4.3 |
| Whey Protein Isolate: Beeswax:Sorbitol (3.5:1.8:1) | 23° C., 50% RH | 11.6 |
| Acetylated Monoglyceride: Gluten:Glycerol (0.1:2.5:1) | 23° C., 0% RH | 2.67 |
| Whey Protein Isolate: Sorbitol (3.5:1) | 23° C., 40% RH | 0.7 |
| Wheat Gluten:Glycerol (2.5:1) | 23° C., 0% RH | 3.8 |
| Corn Zein:Glycerol (5:1) | 23° C., 0% RH | 7.7 |
| Collagen | 23° C., 63% RH | 2.3 |
| Collagen | 23° C., 93% RH | 89.0 |
| Beeswax | 25° C., 0% RH | 931.7 |
| Carnuba Wax | 25° C., 0% RH | 157.2 |
| Low Density Polyethylene | 23° C., 50% RH | 1870 |
| High Density Polyethylene | 23° C., 50% RH | 427 |
| Cellophane | 23° C., 95% RH | 252 |
| Ethylene-vinyl alcohol (70% VOH[1]) copolymer | 23° C., 0% RH | 0.1 |
| Ethylene-vinyl alcohol (70% VOH) copolymer | 23° C., 95% RH | 12 |
| Polyvinylidene chloride (plasticized) | 23° C., 50% RH | 5.1 |

*Oxygen permeability was calculated at atmospheric pressure and 23° C.
[1]Vinyl alcohol.

Example 7

This example illustrates the effect of homogenization and particle size on WVP.

Emulsion films of whey protein/beeswax/sorbitol (56%/28%/16%) were formed as described above. Four films were prepared in which the level of homogenization was varied to examine its effect on WVP. Homogenization levels were as follows:

Level 1: 1.5 min at 13,500 rpm and 1.0 min at 20,500 rpm

Level 2: 1.5 min at 13,500 rpm and 4.0 min at 20,500 rpm

Level 3: 1.5 min at 13,500 rpm, 4.0 min at 20,500 rpm, and one pass at 0, 200, and 400 bars Level 4: Same treatment as level 3 plus one pass at 400 and 600 bars.

Figure 5:
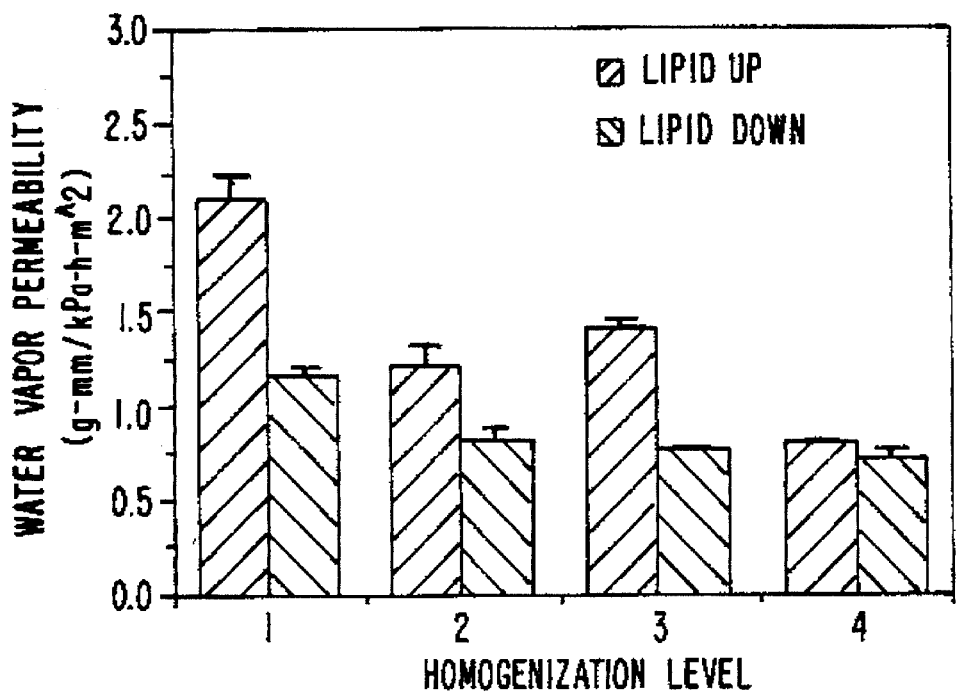
FIG. 5 shows the effects of homogenization and lipid orientation on the water vapor permeability of whey protein isolate/beeswax/sorbitol emulsion films.

FIG. 5 shows the effects of homogenization and orientation on the WVP of the films. Increased homogenization of whey protein emulsion films decreased film water vapor permeability due to an increase in the protein-lipid interfacial area. As films formed, partial separation of the lipid often occurred. This resulted in orientation effects (water vapor permeability differences between testing films with the lipid side exposed to high versus low relative humidities). Orientation effects decreased with increased homogenization, due to the increased stability of the emulsions.

Figure 6:
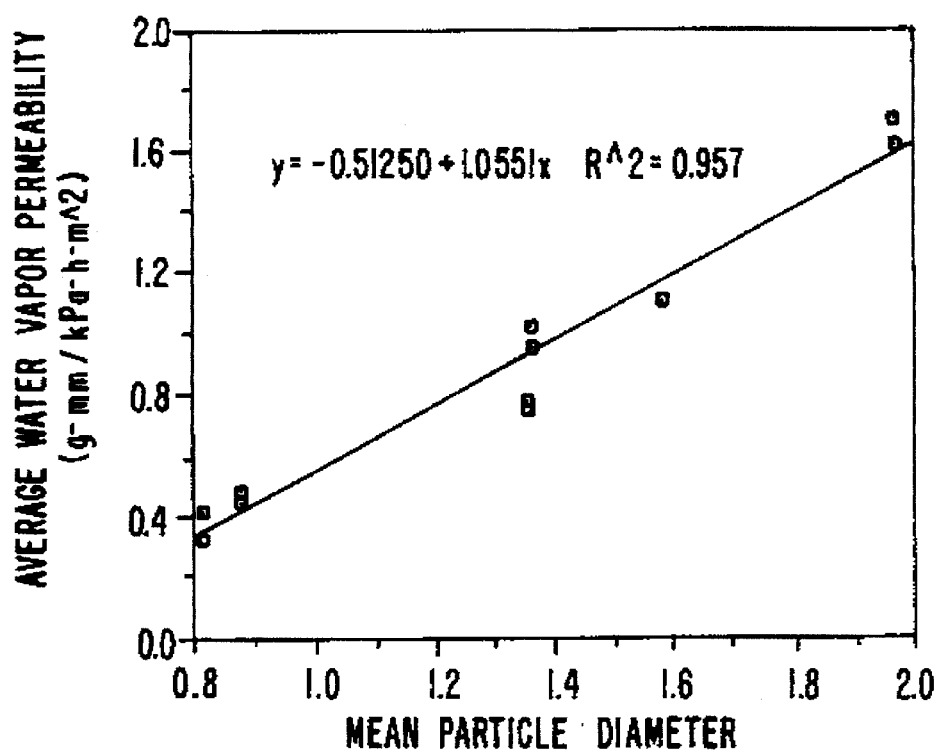
FIG. 6 shows the effect of mean emulsion particle diameter on the water vapor permeability of whey protein isolate/beeswax/sorbitol emulsion films.

Emulsion particle size of the various films was measured by laser spectroscopy. The effect of emulsion particle size on the water barrier properties of whey protein/beeswax/sorbitol (56%/28%/16%) films is shown in FIG. 6. A linear relationship between mean emulsion particle diameter and WVP was found. Thus increased homogenization can produce coatings and films with improved film barrier properties and improved mechanical properties. Homogenization was also demonstrated as a means for regulation of the barrier properties of edible emulsion film systems through particle size control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for preparing a protein-based water-insoluble coating for a food item, comprising:
   (i) treating an aqueous solution of a protein, said protein being substantially free of any sugars and present in an amount of from 5 to 20% by weight, to effect disulfide formation in said protein solution thereby forming a denatured protein solution; and
   (ii) applying said denatured protein solution to a food item and drying to form a coating for said food item.

2. A method in accordance with claim 1 wherein said protein is selected from the group consisting of milk proteins, whey proteins, casein, wheat proteins, soy proteins, ovalbumin, corn zein, peanut proteins and keratin.

3. A method in accordance with claim 1 wherein said treatment of step (i) is selected from the group consisting of a heat treatment, a chemical treatment, an enzymic treatment and combinations thereof.

4. A method in accordance with claim 1 wherein dissolved gases are removed from said aqueous protein solution prior to step (i).

5. A method in accordance with claim 1 further comprising step ($i_a$) wherein a lipid component is added to said denatured protein solution, step ($i_a$) taking place between steps (i) and (ii).

6. A method in accordance with claim 5 wherein said lipid component is selected from the group consisting of fatty acids, fatty alcohols, waxes, triglycerides, monoglycerides, and mixtures thereof.

7. A method in accordance with claim 1 further comprising step ($i_b$) wherein a food grade plasticizer is added to said denatured protein solution, step ($i_b$) taking place between steps (i) and (ii).

8. A method in accordance with claim 7 wherein said food grade plasticizer is selected from the group consisting of sorbitol, glycerol and polyethylene glycol.

9. A method in accordance with claim 5 wherein step ($i_a$) further comprises adding a food grade plasticizer to said denatured protein solution.

10. A method in accordance with claim 9 wherein said protein is selected from the group consisting of milk proteins, whey proteins, casein, wheat proteins, soy proteins, ovalbumin, corn zein, peanut protein and keratin, said food grade plasticizer is selected from the group consisting of sorbitol, glycerol and polyethylene glycol, said lipid component is selected from the group consisting of fatty acids, fatty alcohols, waxes, triglycerides, monoglycerides, and mixtures thereof, and said treatment of step (i) is a heat treatment.

11. A method in accordance with claim 5 further comprising a step ($i_c$) wherein said denatured protein solution is heated to a temperature above the melting point of said lipid component and homogenized for a period of time sufficient to form an emulsion having particle sizes of from 0.05 to 4.0 microns, said step ($i_c$) taking place between step ($i_a$) and step (ii).

12. A method for preparing a protein-based water-insoluble edible film for use as a food wrap, comprising:
   (i) treating an aqueous solution of a protein, said protein being substantially free of any sugars and present in said aqueous solution in an amount of from 5 to 20% by weight, to effect disulfide formation in said protein solution thereby forming a denatured protein solution; and
   (ii) forming said denatured protein solution into said protein-based water-insoluble edible film.

13. A method in accordance with claim 12 wherein said protein is selected from the group consisting of milk proteins, whey proteins, caseins, wheat proteins, soy proteins, egg proteins, peanut proteins, corn zein and keratin.

14. A method in accordance with claim 12 wherein said treatment of step (i) is selected from the group consisting of a heat treatment, a chemical treatment and an enzymic treatment.

15. A method in accordance with claim 12 wherein dissolved gases are removed from said aqueous protein solution prior to step (i).

16. A method in accordance with claim 12 further comprising step ($i_a$) wherein a lipid component is added to said denatured protein solution, step ($i_a$) taking place between steps (i) and (ii).

17. A method in accordance with claim 16 wherein said lipid component is selected from the group consisting of fatty acids, fatty alcohols, waxes, triglycerides, monoglycerides, and mixtures thereof.

18. A method in accordance with claim 12 further comprising step ($i_b$) wherein a food grade plasticizer is added to said denatured protein solution, step ($i_b$) taking place between steps (i) and (ii).

19. A method in accordance with claim 18 wherein said food grade plasticizer is selected from the group consisting of sorbitol, glycerol and polyethylene glycol.

20. A method in accordance with claim 16 wherein step ($i_a$) further comprises adding a food grade plasticizer to said denatured protein solution.

21. A method in accordance with claim 20 wherein said protein is selected from the group consisting of milk proteins, whey proteins, caseins, wheat proteins, soy proteins, egg proteins, peanut proteins, corn zein and keratin, said food grade plasticizer is selected from the group consisting of sorbitol, glycerol and polyethylene glycol, said lipid component is selected from the group consisting of fatty acids, fatty alcohols, waxes, triglycerides, monoglycerides, and mixtures thereof, and said treatment of step (i) is a heat treatment.

22. A method in accordance with claim 16 wherein between step (i) and step (ii), said denatured protein solution is heated to a temperature above the melting point of said lipid component and homogenized for a period of time sufficient to form an emulsion having particle sizes of from 0.05 to 4.0 microns.

23. A method of producing a foodstuff having a water-insoluble protein-based coating comprising:
   (i) dissolving a protein in water to produce an aqueous protein solution, said protein being substantially free of any sugars and present in said aqueous protein solution in an amount of from 5 to 20% by weight,
   (ii) coating said foodstuff with said aqueous protein solution to produce a coated foodstuff; and
   (iii) treating said coated foodstuff to effect disulfide formation in said protein and provide a foodstuff having a water-insoluble protein-based coating.

24. A method in accordance with claim 23 wherein said protein is selected from the group consisting of milk proteins, whey proteins, caseins, wheat proteins, soy proteins, ovalbumin, corn zein and keratin.

25. A method in accordance with claim 23 wherein dissolved gases are removed from said aqueous protein solution prior to step (ii).

26. A method in accordance with claim 23 further comprising step ($i_a$) wherein a lipid component is added to said aqueous protein solution, step ($i_a$) taking place between steps (i) and (ii).

27. A method in accordance with claim 26 wherein said lipid component is selected from the group consisting of fatty acids, fatty alcohols, waxes, triglycerides, monoglycerides, and mixtures thereof.

28. A method in accordance with claim 23 further comprising step ($i_b$) wherein a food grade plasticizer is added to said aqueous protein solution, step ($i_b$) taking place between steps (i) and (ii).

29. A method in accordance with claim 28 wherein said food grade plasticizer is selected from the group consisting of sorbitol, glycerol and polyethylene glycol.

30. A method in accordance with claim 26 wherein step ($i_a$) further comprises adding a food grade plasticizer to said aqueous protein solution.

31. A method in accordance with claim 30 wherein said protein is selected from the group consisting of milk proteins, whey proteins, caseins, wheat proteins, soy proteins, ovalbumin, corn zein and keratin, said food grade plasticizer is selected from the group consisting of sorbitol, glycerol and polyethylene glycol, and said lipid component is selected from the group consisting of fatty acids, fatty alcohols, waxes, triglycerides, monoglycerides, and mixtures thereof.

32. A method in accordance with claim 26 further comprising a step ($i_c$) wherein said aqueous protein solution is heated to a temperature above the melting point of said lipid component and homogenized for a period of time sufficient to form an emulsion having particle sizes of from 0.05 to 4.0 microns, said step ($i_c$) taking place between step ($i_a$) and step (ii).

33. A protein-based water-insoluble coating for foodstuffs consisting essentially of a denatured protein, a lipid component and a food grade plasticizer, wherein said denatured protein is substantially free of any sugars.

34. A protein-based water-insoluble coating of claim 33 wherein said denatured protein is a member selected from the group consisting of denatured milk proteins, denatured whey proteins, denatured caseins, denatured wheat proteins, denatured soy proteins, denatured egg proteins, denatured peanut proteins, denatured corn zein and denatured keratin.

35. A protein-based water-insoluble film consisting essentially of a denatured protein, a lipid component and a food grade plasticizer, wherein said denatured protein is substantially free of any sugars.

36. A foodstuff coated with a film of claim 35.

37. A foodstuff coated with a coating of claim 33.

* * * * *